Sept. 20, 1949.           A. R. SIGMUNDI           2,482,721
                    BAIT-RETAINER FOR FISHHOOKS
                         Filed Aug. 18, 1947

INVENTOR.
A. R. SIGMUNDI
BY
*Merrill M. Blackburn*
ATTORNEY

Patented Sept. 20, 1949

2,482,721

UNITED STATES PATENT OFFICE 2,482,721

BAIT RETAINER FOR FISHHOOKS

Arthur Roy Sigmundi, Cedar Rapids, Iowa

Application August 18, 1947, Serial No. 769,104

2 Claims. (Cl. 43—27)

My present invention relates to fishing apparatus and more particularly to fishhooks provided with means for preventing inadvertent loss of bait, such as dough bait. The principal objects of this invention are the provision, in connection with a fishhook, of means which will hold a bait attached to the hook so that when a cast is made the bait will not inadvertently fly off the hook, as is now a common happening with an ordinary fishhook; the provision of means connected with an ordinary fishhook which will permit dough bait to be molded about the hook so that it will be held in place when casting and will not be jerked off the hook by the cast; and such further objects and advantages as will hereafter appear and as are inherent in the structure disclosed herein.

In the drawings annexed hereto and forming a part hereof,

Figures 1, 2:
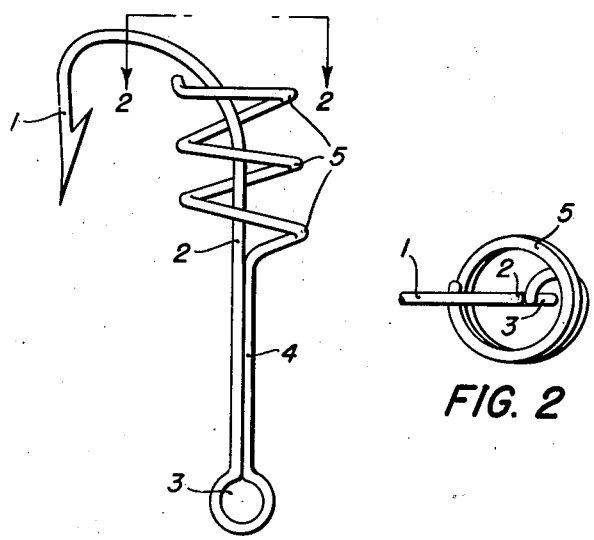
Fig. 1 is a side elevation of a fishhook embodying my invention.
Fig. 2 is a broken plan view of the structure shown in Fig. 1, looking in the direction of the arrows 2.

Reference will now be made in greater detail to the annexed drawings for a more complete description of this invention. While I have embodied this inventive idea in several different forms, I regard that shown in the drawings as the preferable one. This comprises a hook 1, attached to one end of a shank 2 which has at its second end an eye 3. Integral with the eye 3 is a shank 4 which has, at its second end, a coil 5.

In fishing for catfish, bullheads, carp, and buffalo, it is a common practice to make up a dough bait and mold this around the hook. However, in making a cast, it often happens that the dough flies off the hook and is lost. When a hook is provided with a coil, such as shown in the drawings, and the dough is molded around the hook and around and within the coil, it is held more securely and is rarely lost.

The shanks 2 and 4 need not necessarily be secured together but it is believed more satisfactory to solder them together or otherwise secure them in juxtaposition.

While I have disclosed what is now regarded as the preferred embodiment of this invention, I desire this disclosure to be regarded as illustrative only and not as limiting the invention.

Having now described by invention, I claim:

1. A fishhook having a hook member, a shank integral at one end therewith, and a line-attaching eye at the other end of the shank, in combination with a bait-holding coil surrounding the shank adjacent the hook member, said coil having a shank which is integral with the eye and extends along the hook shank, is closely adjacent thereto and holds the coil spaced from the hook shank and adjacent the hook member.

2. A fishhook having a hook member, a shank integral at one end therewith, and a line-attaching eye at the other end of the shank, in combination with a bait-holding coil surrounding the shank adjacent the hook member, said coil having a shank on the end of the coil remote from the hook member and extending along the hook shank, closely adjacent thereto and holding the coil spaced from the hook shank and adjacent the hook member.

ARTHUR ROY SIGMUNDI.

REFERENCES CITED

The following references are of record in the file of this patent:

UNITED STATES PATENTS

| Number | Name | Date |
|---|---|---|
| D. 33,775 | Bower | Dec. 25, 1900 |
| 103,645 | Muscroft | May 31, 1870 |
| 1,249,342 | Dahl | Dec. 11, 1917 |

FOREIGN PATENTS

| Number | Country | Date |
|---|---|---|
| 6,810 | Great Britain | 1900 |